United States Patent
Mack et al.

(10) Patent No.: US 11,959,682 B2
(45) Date of Patent: Apr. 16, 2024

(54) REFRIGERATION APPLIANCE HAVING PARALLEL EVAPORATORS AND OPERATING METHOD THEREFOR

(71) Applicant: BSH Hausgeraete GmbH, Munich (DE)

(72) Inventors: Lars Mack, Sontheim (DE); Hans Ihle, Giengen (DE); Achim Paulduro, Langenau (DE)

(73) Assignee: BSH Hausgeraete GmbH, Munich (DE)

( * ) Notice: Subject to any disclaimer, the term of this patent is extended or adjusted under 35 U.S.C. 154(b) by 446 days.

(21) Appl. No.: 17/426,134

(22) PCT Filed: Jan. 27, 2020

(86) PCT No.: PCT/EP2020/051933
§ 371 (c)(1),
(2) Date: Jul. 28, 2021

(87) PCT Pub. No.: WO2020/157010
PCT Pub. Date: Aug. 6, 2020

(65) Prior Publication Data
US 2022/0099339 A1    Mar. 31, 2022

(30) Foreign Application Priority Data

Feb. 1, 2019   (DE) .......................... 102019201291.4

(51) Int. Cl.
*F25B 5/02*     (2006.01)
*F25B 41/22*    (2021.01)
(Continued)

(52) U.S. Cl.
CPC ................ *F25B 5/02* (2013.01); *F25B 41/22* (2021.01); *F25B 41/385* (2021.01); *F25B 49/02* (2013.01); *F25B 2600/2507* (2013.01)

(58) Field of Classification Search
CPC .......... F25B 5/02; F25B 41/22; F25B 41/385; F25B 49/02; F25B 2600/2507;
(Continued)

(56) References Cited

U.S. PATENT DOCUMENTS

| 6,397,608 B1 | 6/2002 | Sakuma et al. |
| 8,141,372 B2 | 3/2012 | Guffler et al. |
| 2018/0299024 A1 | 10/2018 | Matsuzaki et al. |

FOREIGN PATENT DOCUMENTS

| CN | 1382949 A | 12/2002 |
| CN | 105042985 A | 11/2015 |

(Continued)

*Primary Examiner* — Kun Kai Ma
(74) *Attorney, Agent, or Firm* — Laurence A. Greenberg; Werner H. Stemer; Ralph E. Locher

(57) ABSTRACT

A refrigeration appliance includes at least one warm storage compartment and one cold storage compartment and a refrigeration device having at least two mutually parallel evaporators connected in series with a compressor, a condenser, and a shut-off valve between the condenser and evaporators in a refrigerant circuit so that each evaporator cools one storage compartment. An operating method for the refrigeration appliance includes the steps a) deciding whether a need for cooling has newly occurred in the warm storage compartment, and, if so, b) operating the compressor while the shut-off valve is closed to cause refrigerant to back up in the condenser, c) opening the shut-off valve and supplying the evaporator of the warm storage compartment with the backed up refrigerant. In step b) the mass flow rate through the compressor is estimated and the time for performing step c) is determined by using the estimated mass flow rate.

14 Claims, 2 Drawing Sheets

(51) Int. Cl.
*F25B 41/385* (2021.01)
*F25B 49/02* (2006.01)

(58) Field of Classification Search
CPC ........ F25B 2600/2519; F25B 2700/151; F25B 2700/171; F25B 2700/2104; F25B 2700/2106; Y02B 40/00
See application file for complete search history.

(56) References Cited

FOREIGN PATENT DOCUMENTS

| | | | | |
|---|---|---|---|---|
| CN | 106595126 A | 4/2017 | | |
| DE | 102006015989 A1 | 10/2007 | | |
| DE | 102011075004 A1 | 10/2012 | | |
| DE | 102012218345 A1 * | 4/2014 | ............ | F25B 41/043 |
| DE | 102012218345 A1 | 4/2014 | | |
| DE | 102014217671 A1 * | 3/2016 | ............. | F25B 41/04 |
| DE | 102014217671 A1 | 3/2016 | | |
| EP | 1106943 B1 | 8/2005 | | |
| JP | 2019074300 A | 5/2019 | | |
| WO | WO-2016034443 A1 * | 3/2016 | ............ | F25D 11/022 |

* cited by examiner

REFRIGERATION APPLIANCE HAVING PARALLEL EVAPORATORS AND OPERATING METHOD THEREFOR

BACKGROUND OF THE INVENTION

Field of the Invention

The present invention relates to a refrigeration appliance having parallel evaporators and a method for operating such a refrigeration appliance.

With refrigeration appliances having a number of storage compartments for different temperatures, in which a separate evaporator is assigned to each storage compartment, the evaporators in a refrigerant circuit can be connected in series or in parallel. Evaporators connected in series have the disadvantage that it is only possible to a very restricted extent to selectively cool the storage compartments, since the evaporators can only either be supplied with refrigerant together or not at all. Refrigeration appliances with parallel evaporators have a complicated setup, since valves which allow one or the other evaporator to be selectively separated from the refrigerant supply are required for a selective supply of the evaporators.

If an evaporator is cut off from the residual refrigerant circuit by means of such a valve, the liquid refrigerant contained in the evaporator also no longer takes part in the circulation through this residual refrigerant circuit, so that the quantity of refrigerant circulating in the residual refrigerant circuit can vary, depending on how much liquid refrigerant is currently stored in the cut-off evaporator. An inadequate filling of the refrigerant circuit nevertheless results in inefficient operation. In order to remedy this problem, it is known e.g. from EP 1106943 B1, in each case when identifying the need for cooling in the warmer storage compartment, to close a valve between the output of the condenser and the evaporators and to operate the compressor in order in this way to recirculate refrigerant from the evaporator of the colder storage compartment into the condenser and thus to have available an adequate quantity of refrigerant for the subsequent cooling operation of the warmer compartment.

The quantity of refrigerant to be returned in this way is to be defined in accordance with EP 1106943 B1 as a function of the ambient temperature, in particular with a lower ambient temperature the time span, in which the compressor operates with a closed valve, is to be selected longer than with a higher ambient temperature.

Indeed, in this way it is possible, in the long-term means, for the quantity of refrigerant circulating when the warmer compartment is cooled to be greater with a lower ambient temperature than with higher individual fluctuations which result in each case in it being possible for different quantities of liquid coolant to be contained in the evaporator of the colder compartment when a need for cooling arises in the warmer compartment, and accordingly the quantities of liquid refrigerant still contained therein after recirculation can vary from case to case, but may in this way not be prevented, however.

SUMMARY OF THE INVENTION

An object of the invention is therefore to specify a refrigeration appliance or an operating method therefor, with which it can be reliably ensured that a measured quantity of circulating refrigerant is always available in order to operate the warmer evaporator.

The object is achieved on the one hand by, with a method for operating a refrigeration appliance with at least one warm and one cold storage compartment and a refrigeration device, in which at least two evaporators that are parallel to one another are connected in series with a compressor, a condenser and a shut-off valve arranged between the condenser and the evaporators to form a refrigerant circuit, having the steps a) deciding whether a need for cooling has newly arisen in the warm storage compartment and if yes, b) operating the compressor while the shut-off valve is closed in order to cause refrigerant to back up in the condenser, c) opening the shut-off valve and supplying the evaporator of the warm storage compartment with backed up refrigerant, in step b), the mass flow rate through the compressor is estimated and the time for carrying out step c) is determined by means of the estimated mass flow.

To prevent the quantity of circulating refrigerant from becoming too large, if the need for cooling arises twice in the warmer compartment, without the evaporator of the colder compartment being filled in the meantime, it should in particular be prevented from circulating again out of the latter. Therefore, step b) is preferably only then carried out if the storage compartment most recently supplied before the time of step a) is the cold storage compartment.

Since the mass flow rate is reduced accordingly as the evaporator of the colder compartment empties during the recirculation process, it is possible to draw a conclusion therefrom as to the quantity of refrigerant remaining behind in the evaporator or backed-up in the condenser, and the duration of the recirculation can be controlled so that after recirculation in each individual case, a quantity of circulating refrigerant suited to the operation of the evaporator of the warmer compartment is available.

The mass flow rate can be estimated with little effort on the basis of the power input and/or the speed of the compressor.

It can be assumed here that the mass flow rate is linearly proportional to the power input of the compressor.

In simple terms, the mass flow rate can be estimated by assuming that the temperature of the refrigerant at a suction connection of the compressor is the evaporation temperature of the refrigerant in the evaporator of the cold storage compartment. This produces the density of the refrigerant at the suction connection and by this being multiplied with the volume throughput, the mass flow rate can be calculated.

In practice, the refrigerant absorbs ambient heat on the way from the evaporator to the suction connection. In order to enable a more realistic estimation of the mass throughput, a temperature sensor for detecting the temperature of the drawn-in refrigerant can be provided at the suction connection.

It is more cost-effective than a dedicated temperature sensor at the suction connection if a typically already available temperature sensor can be made usable for the present invention. One possibility of this is to use and assume an ambient temperature sensor, that on its way from the evaporator to the compressor the temperature of the refrigerant vapor approaches the ambient temperature measured by the ambient temperature sensor up to a fixed differential value, i.e. the mass flow rate can be estimated by assuming that the temperature of the refrigerant at a suction connection of the compressor lies about a fixed differential value below the ambient temperature.

This first differential value typically amounts to 2-5° C., preferably approx. 4° C.

In particular, when the speed of the compressor is known, the volume throughput can be estimated from this and from a known suction-side displaced volume of the compressor, and the mass flow rate can be estimated by multiplication with the density corresponding to the assumed temperature at the suction connection.

Similarly, it can be assumed that when the compressor is in operation with a fixed speed, the temperature in the condenser lies about a second fixed differential value above the ambient temperature. Consequently, the mass flow rate can be estimated by assuming that the pressure at the pressure connection of the compressor corresponds to the saturation vapor pressure of the refrigerant with the ambient temperature raised by the differential value.

In particular, with a known speed of the compressor and a known pressure-side displaced volume, it is possible to calculate the volume throughput at the pressure connection of the compressor as a product of the two and the mass flow rate as a product of the volume throughput and the density of the refrigerant which corresponds to the assumed temperature.

In order to improve the quality of an estimation of the refrigerant quantity contained in the evaporator of the colder compartment or the compressor runtime required to circulate the respectively required refrigerant quantity, the compartment temperature of the colder compartment can still also be evaluated before step b, in order to identify and consider a refrigerant distribution which deviates from the normal e.g. shortly after super operation, on the basis of an excessively low compartment temperature or the opening of a door or a storage of warm refrigerant on the basis of an excessively high compartment temperature. Therefore an excessively low compartment temperature will generally lead to an extension of step b), an excessively high compartment temperature will lead to its shortening.

Alternatively or in addition, it is also possible to assess how long the last compartment supply time of the colder compartment has lasted, in order to adjust the duration of step b) accordingly. I.e. the longer this compartment supply time has lasted, the larger therefore the expected quantity of liquid refrigerant in the evaporator of the colder compartment, and therefore the longer the recirculation phase of step b) lasts.

In principle, on the basis of a one-off estimation performed at the start of the pumping down, for instance, it is possible to determine how long the pumping-down phase should last, i.e. how long to wait until step c) is carried out.

Alternatively, the mass flow rate can be estimated repeatedly during the recirculation and step c) can be carried out if the estimation has produced a value of the mass flow rate below a threshold.

The object is further achieved by, with a refrigeration appliance, in particular a household refrigeration appliance, having at least one warm and one cold storage compartment, a refrigeration device, in which at least two evaporators that are parallel to one another are connected in series with a compressor, a condenser and a shut-off valve arranged between the condenser and the evaporators to form a refrigerant circuit in order for each evaporator to cool one of the storage compartments, and with a control unit for controlling the operation of the compressor, the control unit is configured, in particular programmed, to carry out the afore-described method.

The subject matter of the invention is further a computer program product with program code means, which enable a computer to execute the above-described method or to operate as described above as a control unit in a refrigeration appliance.

Further features and advantages of the invention result from the description of exemplary embodiments which follows with reference to the appended drawings.

DETAILED DESCRIPTION OF THE INVENTION

Figure 1:
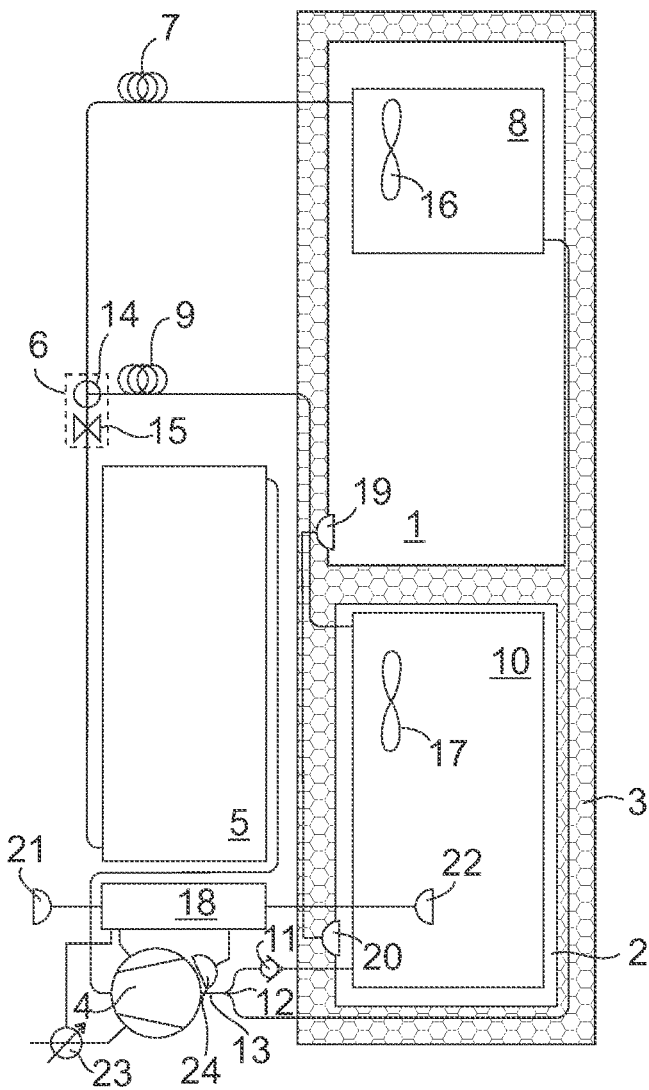
FIG. 1 shows a block diagram of an inventive refrigeration appliance.

FIG. 1 shows a schematic representation of a household refrigeration appliance with at least one warm storage compartment 1 and one cold storage compartment 2, which are surrounded by a shared heat-insulating housing 3. The warm storage compartment 1 can be e.g. a normal refrigerator compartment and the cold storage compartment 2 can be a freezer compartment. A refrigerant circuit comprises a speed-regulated compressor 4 which can be operated at various non-zero speeds, a condenser 5 connected to a pressure connection of the compressor 4, a valve assembly 6 with one input connected to the condenser 5 and two outputs, a first throttling point 7, typically a capillary, which is connected to a first output of the valve assembly 6, a first evaporator 8 connected to an output of the throttling point 7 for cooling the warm storage compartment 1, a second throttling point 9, which is connected to the second output of the valve assembly 6, a second evaporator 10 connected to an output of the throttling point 9 for cooling the cold storage compartment 2, a non-return valve 11 at an output of the second evaporator 10, a T-piece 12, which connects an output of the first evaporator 8 with an output of the non-return valve 11, and a suction line 13, which connects an output of the T-piece 12 to a suction connection of the compressor 4.

The valve assembly 6 supports a first state, in which it connects its input to the first output, a second state, in which it connects the input with the second output and a third state, in which the input and both outputs are separated from one another. For this purpose it can have a directional valve 14 in series with a shut-off valve 15.

A ventilator 16, 17 can be provided in both storage compartments 1, 2, in each case, in order to drive an air flow over the evaporators 8, 10 of the relevant compartment and thus to influence the cooling power of the relevant evaporator 8, 10.

In order to control the operation of the compressor 4 and the valve assembly 6, a control circuit 18, preferably a microprocessor or microcontroller, is connected to temperature sensors 19, 20, which are arranged on the storage compartments 1, 2, in order to detect their temperatures. The control circuit 18 can furthermore be connected to an ambient temperature sensor 21, a temperature sensor 19 for detecting the temperature of the evaporator 8 of the warmer compartment 1, a current intensity sensor 23 for detecting a supply current strength of the compressor 4, and/or a speed sensor 24 for detecting the speed of the compressor 4.

Figure 2:
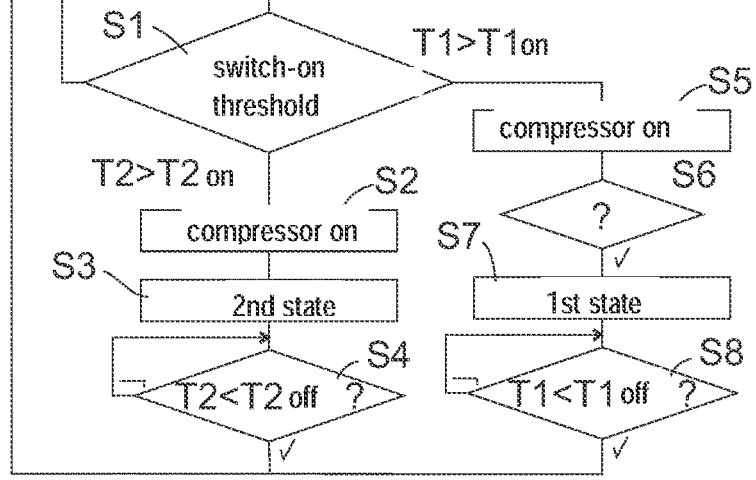
FIG. 2 shows a flow chart of an operating method of the refrigeration appliance.

FIG. 2 shows a flow chart of an operating method carried out by the control circuit 18. The description of the method starts at a time at which neither of the two compartments 1, 2 has a need for cooling, and the compressor 4 is therefore switched. The valve assembly 6 is located in the third state, the non-return valve 11 is closed. The temperatures of the two evaporators 8, 10 correspond somewhat to those of the compartments 1, 2, cooled thereby; the pressures in the evaporators 8, 10 are the vapor pressures of the refrigerant which correspond to these temperatures. A pressure equalization between the evaporators 8, 10 is prevented by the non-return valve 11 and the valve assembly 6.

In order to identify whether a need for cooling has arisen in one of the compartments 1, 2, the step S1 of comparing the compartment temperatures T1, T2 measured by the temperature sensors 19, 20 is repeated until one of these is increased by way of a switch-on threshold T1 on or T2on. If the exceeded switch-on threshold is T2on, i.e. when there is a need for cooling in the colder compartment 2, then the compressor 4 is switched on (S2). The refrigerant taken from the compressor 4 originates primarily from the warmer evaporator 8, provided this contains liquid refrigerant. The valve assembly 6 is promptly switched into the second state (S3), in order to supply the compressed refrigerant condensed in the condenser 5 to the evaporator 10. The thus achieved operating state is retained until the compartment temperature T2 does not reach a switch-off threshold T2off (S4).

If the switch-on threshold in Step S1 is T1 on, the compressor 4 is likewise switched on (S5), and the speed selected in this case for the compressor 4 can be set differently from that in Step S2. If the evaporator supplied in an immediately preceding operating phase of the compressor 4 has become the evaporator 8, it can then be assumed therefrom that refrigerant has already been circulated out from the evaporator 10 and the quantity in circulation is sufficient for an efficient operation of the evaporator 8. In this case, the method jumps immediately to the next described step S7. On the other hand, the valve assembly 6 remains in the third state, so that the refrigerant conveyed from the compressor 4 backs up in the condenser 5. Since no fresh refrigerant therefore reaches the evaporator 8, the pressure in the suction line 13 reduces until the pressure in the evaporator 10 is not met, the non-return valve 11 opens and the refrigerant is drawn off from the evaporator 10.

If in step S6 a condition explained in more detail below is fulfilled, the control circuit 18 moves the valve assembly 6 into the first state (S7), the refrigerant backed up in the condenser flows to the first evaporator 8, and this begins to cool the compartment 1. Since the temperature of the compartment 1 is higher than that of compartment 2, the pressure of the refrigerant vapor flowing off from the evaporator 8 is higher than the pressure in the evaporator 10. As a result, the non-return valve 11 closes, so that the evaporator 10 is uncoupled from the remaining refrigerant circuit both at its input and also at the output and the quantity of refrigerant circulating between the compressor 4, condenser 5 and evaporator 8 no longer changes.

The efficiency with which the compartment 1 is cooled depends upon the quantity of this circulating refrigerant. If this is too low, then a large part of the refrigerant in the condenser must be concentrated, so that a pressure suited to condensing can be established there, and there is only a small amount of refrigerant available for vaporization, which evaporates at low pressure and a corresponding low temperature. If it is too high, then a high compressor power is required in order to maintain a suitable pressure in the evaporator 8 and in order to feed the drawn-in refrigerant into the condenser 5 under high pressure. For an efficient cooling operation, it is therefore important to select the time for the switch over of the valve assembly 6 into the first state so that irrespective of how much refrigerant is contained in the second evaporator at time of step S5, the distribution of the refrigerant onto the evaporator 10 on the one hand and onto the residual coolant circuit on the other hand is essentially the same with each repetition of the method at the time of step S7.

Figure 3:
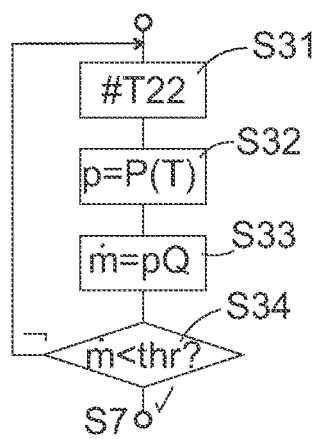
FIG. 3 shows a detail of the method.

This is achieved in step S6 by estimating the mass flow rate of the refrigerant drawn off from the evaporator 10. This mass flow rate is all the greater the larger the quantity of refrigerant currently contained in the evaporator 10; in simple terms, it can be assumed that the quantity of vapor drawn off per time unit is directly proportional to the quantity of the liquid refrigerant in the evaporator 10. The mass flow rate further corresponds to the suction-side volume throughput of the evaporator 4, multiplied by the density of the drawn-in refrigerant. The former is the product of the constant and known displaced volume of the compressor 4 and its speed measured by the speed sensor, the latter can be derived from the temperature of the evaporator 10 detected by the temperature sensor 22 on the basis of the vapor pressure curve of the refrigerant. I.e. the control circuit 18 measures, as shown in FIG. 3, the evaporator temperature (S31), determines therefrom the pressure p in the evaporator 10 (S32) and multiplies this with the volume throughput Q of the compressor 4 (S33) in order to obtain the mass flow rate m. As soon as this mass flow rate does not reach a predetermined limit value (S34) in the course of the repeated measurements of the speed and the evaporator temperature, the condition of step S6 is fulfilled, and the control unit switches the valve assembly 6 into the first state.

Figure 4:
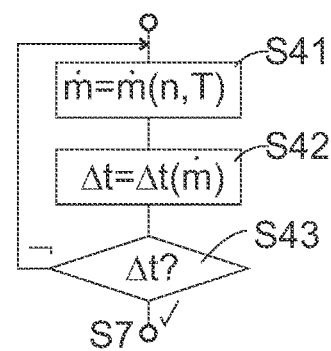
FIG. 4 shows a variant of the detail.

One problem can result with this estimation of the mass flow rate that by recirculating refrigerant out from the evaporator 10, in that the evaporation temperature of the refrigerant in the evaporator 10 reduces, but the measured evaporator temperature of this actual evaporation temperature only follows with a delay. On the other hand, it can be assumed that at the time of commissioning the compressor 4 both temperatures still correspond to one another. This fact can be used by, according to a variant shown in FIG. 4, the mass flow rate in only being estimated (S41) immediately after the start of the compressor 4 on the basis of its stationary speed n reached shortly after the start and the temperature T20 of the compartment 2 or T22 of the evaporator 10 measured at this time. Since the mass flow rate in, as specified above, can be assumed to be proportional to the mass in of the refrigerant contained in the evaporator 10, the knowledge of the mass flow rate ṁ is sufficient to estimate the mass m still contained in the evaporator 10 itself and subsequently to estimate an operating time Δt of the compressor 4 (S42), which is required to reduce this mass m to a predetermined value. As soon as this operating time Δt has elapsed (S43), the valve arrangement is moved into the first state in step S7.

In this case, according to one development, it may be useful to consider a temperature detected in the storage compartment 2 by the sensor 22. If this is below the switch-off threshold, then it is possible to conclude recent super operation and therefore a relatively large quantity of liquid refrigerant in the evaporator 10, so that in this case, the operating time Δt in step S42 is estimated to be higher than when a compartment temperature is measured between the on and off switching value. Conversely, a compartment temperature above the switch-on value can indicate that a larger quantity of fresh, warm refrigerated goods has recently been loaded into the compartment 2, and the liquid refrigerant of the evaporator 10 has therefore largely been consumed. In this case, the operating time Δt in step S42 is estimated to be lower than with a normal compartment temperature between the on and off switching value.

According to another development, it can be taken into consideration that the temperature, with which the refrigerant reaches the compressor 4, is no longer the evaporator temperature, but instead approaches the ambient temperature on its way through the suction line 12. If a temperature sensor is not provided immediately on the suction connection of the compressor 4, in order to measure the temperature of the refrigerant arriving there, it can be assumed for the sake of simplicity that this temperature is lower by a constant value of e.g. 4-5° C., dependent on the structure of the refrigeration appliance, than the ambient temperature measured by the sensor 21. The mass flow rate is therefore estimated by the volume throughput of the compressor 4 not being multiplied by the density in the evaporator temperature, as described above, but instead by the density with the measured or estimated temperature at the suction connection of the compressor 4.

According to a further modification, it is assumed that during operation of the compressor 4, the temperature of the condenser 5 is higher by a constant value in the region of 10-20° C., e.g. approx. 15° C., than the ambient temperature. This makes it possible for the control circuit 18 to derive the pressure at both the suction and also the pressure connection of the compressor 4 from the measured value of the ambient temperature. The mechanical power (isentropic power) introduced from the compressor 4 to compress the refrigerant is proportional to the product of the pressure difference and volume throughput. At the same time, it is a structure-dependent fixed percentage (typically approx. 70%) of the electrical power received from the compressor. This means that the mass flow rate as a product of the volume throughput and density is proportional to the electrical power of the compressor 4, and that a limit value of the mass flow rate is then not met if the electrical power of the compressor 4 falls below a limit value. Since the supply voltage can be assumed to be constant, it is therefore sufficient in this case for the control circuit to monitor the supply current strength of the compressor 4 and to carry out step S6 once this drops below a limit value which is dependent on the ambient temperature.

The association between the limit value of the electrical power and the ambient temperature can be determined empirically and stored in a storage device of the control circuit 18.

REFERENCE CHARACTERS 1 (warm) storage compartment
2 (cold) storage compartment
3 housing
4 compressor
5 condenser
6 valve assembly
7 (first) throttling point
8 (first) evaporator
9 (second) throttling point
10 (second) evaporator
11 non-return valve
12 T-piece
13 suction line
14 directional valve
15 shut-off valve
16 ventilator
17 ventilator
18 control circuit
19 temperature sensor
20 temperature sensor
21 temperature sensor
22 temperature sensor
23 current intensity sensor
24 speed sensor

The invention claimed is:

1. A method for operating a refrigeration appliance, the method comprising:
   providing at least one warm storage compartment and at least one cold storage compartment;
   providing a refrigeration device having a refrigerant circuit including at least two mutually parallel evaporators connected in series with a compressor, a condenser, and a shut-off valve disposed between the condenser and the evaporators, permitting each evaporator to cool a respective one of the compartments;
   a) deciding whether a need for cooling has newly arisen in the warm storage compartment and, if so,
   b) operating the compressor while the shut-off valve is closed to cause refrigerant to back up in the condenser,
   c) opening the shut-off valve and supplying the evaporator of the warm storage compartment with the backed-up refrigerant, and
   in step b) estimating a mass flow rate through the compressor and determining a time for carrying out step c) by using the estimated mass flow rate.

2. The method according to claim 1, which further comprises carrying out step (b) only when the storage compartment last supplied before the time of step a) is the cold storage compartment.

3. The method according to claim 1, which further comprises estimating the mass flow rate based on a power input of the compressor.

4. The method according to claim 3, which further comprises estimating the mass flow rate to be linearly proportional to the power input of the compressor.

5. The method according to claim 1, which further comprises estimating the mass flow rate based on a speed of the compressor.

6. The method according to claim 1, which further comprises estimating the mass flow rate by assuming that a temperature of a refrigerant at a suction connection of the compressor is an evaporation temperature of the refrigerant in the evaporator of the cold storage compartment.

7. The method according to claim 1, which further comprises measuring an ambient temperature and estimating the mass flow rate by assuming that a temperature of a refrigerant at a suction connection of the compressor is below the ambient temperature by a fixed differential value.

8. The method according to claim 1, which further comprises measuring an ambient temperature and estimating the mass flow rate by assuming that a pressure at a pressure connection of the compressor corresponds to a saturation vapor pressure of a refrigerant with the ambient temperature increase by a fixed differential value.

9. The method according to claim 6, which further comprises deriving the temperature of the refrigerant at a pressure connection of the compressor from a temperature of the refrigerant at the suction connection of the compressor by assuming an isentropic change in state in the compressor.

10. The method according to claim 1, which further comprises defining a waiting time until carrying out step c) based on an estimation of the mass flow rate.

11. The method according to claim 1, which further comprises repeatedly estimating the mass flow rate during a course of an operating phase of the compressor, and carrying out step c) when the estimated mass flow rate has produced a value of the mass flow rate below a threshold.

12. A refrigeration appliance or household refrigeration appliance, comprising:
   at least one warm storage compartment and at least one cold storage compartment;
   a refrigeration device having a refrigerant circuit including at least two mutually parallel evaporators connected in series with a compressor, a condenser and a shut-off valve disposed between said condenser and said evaporators, permitting each evaporator to cool a respective one of said storage compartments; and
   a control unit for controlling operation of said compressor, said control unit configured or programmed to carry out the method according to claim 1.

13. The refrigeration appliance according to claim 12, wherein said control unit contains a non-transitory computer-readable program product with program code instructions stored thereon, that when executed by said control unit, perform the steps of the method.

14. A non-transitory computer-readable program product with program code instructions stored thereon, that when executed by a computer, perform the steps of claim 1.

* * * * *